US008726093B2

(12) United States Patent
Droux et al.

(10) Patent No.: US 8,726,093 B2
(45) Date of Patent: May 13, 2014

(54) METHOD AND SYSTEM FOR MAINTAINING DIRECT HARDWARE ACCESS IN THE EVENT OF NETWORK INTERFACE CARD FAILURE

(75) Inventors: Nicolas G. Droux, San Jose, CA (US); Sunay Tripathi, Palo Alto, CA (US)

(73) Assignee: Oracle America, Inc., Redwood City, CA (US)

( * ) Notice: Subject to any disclaimer, the term of this patent is extended or adjusted under 35 U.S.C. 154(b) by 671 days.

(21) Appl. No.: 12/827,973

(22) Filed: Jun. 30, 2010

(65) Prior Publication Data

US 2012/0005521 A1 Jan. 5, 2012

(51) Int. Cl.
*G06F 11/00* (2006.01)

(52) U.S. Cl.
USPC .................. 714/43; 714/25; 714/56

(58) Field of Classification Search
USPC .................. 714/43, 25, 10, 4.1, 5.1
See application file for complete search history.

(56) References Cited

U.S. PATENT DOCUMENTS

| | | | |
|---|---|---|---|
| 5,909,564 A | 6/1999 | Alexander et al. |
| 6,041,053 A | 3/2000 | Douceur et al. |
| 6,070,219 A | 5/2000 | McAlpine et al. |
| 6,131,163 A | 10/2000 | Wiegel |
| 6,163,539 A | 12/2000 | Alexander et al. |
| 6,477,643 B1 | 11/2002 | Vorbach et al. |
| 6,600,721 B2 | 7/2003 | Edholm |
| 6,714,960 B1 | 3/2004 | Bitar et al. |
| 6,721,355 B1 | 4/2004 | McClennon et al. |
| 6,757,731 B1 | 6/2004 | Barnes et al. |
| 6,831,893 B1 | 12/2004 | Ben Nun et al. |
| 6,859,841 B2 | 2/2005 | Narad et al. |
| 6,944,168 B2 | 9/2005 | Paatela et al. |
| 6,963,932 B2 | 11/2005 | Bhat |
| 6,990,106 B2 | 1/2006 | Bhatia |
| 7,003,189 B1 | 2/2006 | Fang et al. |
| 7,046,665 B1 | 5/2006 | Walrand et al. |
| 7,146,431 B2 | 12/2006 | Hipp et al. |
| 7,177,311 B1 | 2/2007 | Hussain et al. |
| 7,260,102 B2 | 8/2007 | Mehrvar et al. |
| 7,272,831 B2 | 9/2007 | Cota-Robles et al. |
| 7,313,142 B2 | 12/2007 | Matsuo et al. |
| 7,356,818 B2 | 4/2008 | Carollo et al. |

(Continued)

OTHER PUBLICATIONS

"Solaris Networking—The Magic Revealed (Part I)"; Sunay Tripathi's Solaris Networking Weblog; Nov. 14, 2005, pp. 1-22 (22 pages).

(Continued)

*Primary Examiner* — Sarai Butler
(74) *Attorney, Agent, or Firm* — Osha Liang LLP

(57) ABSTRACT

A system for maintaining direct hardware access in the event of PNIC failure. A host for the system includes: a processor; a first and a second PNIC, where the first PNIC is activated and all other PNICs are deactivated; a host operating system; a virtual machine; and a hypervisor for transferring packets between the host operating system and the virtual machine. The host operating system includes a link aggregator, multiple host VNICs, and a virtual switch associated with the VNICs. The first virtual machine includes a virtual network protocol stack and a guest VNIC. The link aggregator is configured to determine whether the first PNIC has failed. Based on a determination that the first PNIC has failed, the link aggregator is further configured to: remove a virtual function mapping between the first PNIC and the virtual machine; determine the second PNIC; deactivate the first PNIC; and activate the second PNIC.

18 Claims, 7 Drawing Sheets

(56) References Cited

U.S. PATENT DOCUMENTS

| | | | |
|---|---|---|---|
| 7,440,415 | B2 | 10/2008 | Wild, III et al. |
| 7,502,884 | B1 | 3/2009 | Shah et al. |
| 7,613,132 | B2 | 11/2009 | Tripathi et al. |
| 7,643,482 | B2 | 1/2010 | Droux et al. |
| 7,733,890 | B1 | 6/2010 | Droux et al. |
| 2002/0052972 | A1 | 5/2002 | Yim |
| 2003/0037154 | A1 | 2/2003 | Poggio et al. |
| 2003/0065676 | A1 | 4/2003 | Gbadegesin et al. |
| 2004/0015966 | A1 | 1/2004 | MacChiano et al. |
| 2004/0267866 | A1 | 12/2004 | Carollo et al. |
| 2005/0111455 | A1 | 5/2005 | Nozue et al. |
| 2005/0135243 | A1 | 6/2005 | Lee et al. |
| 2005/0138620 | A1 | 6/2005 | Lewites |
| 2006/0041667 | A1 | 2/2006 | Ahn et al. |
| 2006/0045089 | A1 | 3/2006 | Bacher et al. |
| 2006/0069792 | A1 | 3/2006 | Pinkerton et al. |
| 2006/0070066 | A1 | 3/2006 | Grobman |
| 2006/0174324 | A1 | 8/2006 | Zur et al. |
| 2006/0209718 | A1 | 9/2006 | Kinsey et al. |
| 2006/0233168 | A1 | 10/2006 | Lewites et al. |
| 2006/0294517 | A1 | 12/2006 | Zimmer et al. |
| 2007/0061433 | A1 | 3/2007 | Reynolds et al. |
| 2007/0171904 | A1 | 7/2007 | Tchigevsky |
| 2007/0244972 | A1 | 10/2007 | Fan |
| 2008/0019359 | A1 | 1/2008 | Droux et al. |
| 2008/0144635 | A1 | 6/2008 | Carollo et al. |
| 2009/0222558 | A1* | 9/2009 | Xu et al. .................. 709/224 |
| 2009/0304022 | A1* | 12/2009 | Yang et al. ............... 370/463 |

OTHER PUBLICATIONS

Dovrolis, C., Thayer, B., and Ramanathan, P.: "HIP: Hybrid Interrupt—Polling for the Network Interface," ACM SIGOPS Operating Systems Review, vol. 35, Issue 4, Oct. 2001 (11 pages).

* cited by examiner

METHOD AND SYSTEM FOR MAINTAINING DIRECT HARDWARE ACCESS IN THE EVENT OF NETWORK INTERFACE CARD FAILURE

BACKGROUND

Network traffic is transmitted over a network, such as the Internet, from a sending system (e.g., computer system) to a receiving system (e.g., computer system) via a physical network interface card (PNIC). A PNIC is a physical hardware device found in a typical computer system that allows for the sending and receiving of network traffic. Typically, network traffic is transmitted in the form of data packets, where each data packet includes a header and a payload. The payload contains information regarding the source address, destination address, size, transport protocol used to transmit the data packet, and various other information associated with the data packet. The payload contains the actual data to be transmitted to the receiving system.

SUMMARY

In general, embodiments of the invention may be directed to a computer readable medium including instructions for maintaining direct hardware access in the event of network interface card failure. The instructions include functionality for making a determination that a first physical network interface card (PNIC) has failed. The first PNIC is one of a number of PNICs operatively connected to a host computer system. The first PNIC is activated and the other PNICs in the plurality of PNICs are deactivated. Based on the determination that the first PNIC has failed, the instructions include further functionality for: removing a first virtual function mapping between the first PNIC and a virtual machine executing on the host computer system based on the determination, wherein the first virtual function mapping associates a first virtual function for the first PNIC with the virtual machine; determining a second PNIC from the plurality of PNICs; deactivating the first PNIC; activating the second PNIC; determining a second virtual function for the second PNIC; and creating a second virtual function mapping between the second PNIC and the virtual machine, wherein the second virtual function mapping associates the second virtual function with the virtual machine.

In general embodiments of the invention may be directed to a system for maintaining direct hardware access in the event of network interface card failure. The system includes a host including a processor; a first physical network interface card (PNIC) and a second PNIC, where the first PNIC and the second PNIC are two of the multiple PNICs operatively connected to the host, and where the first PNIC is activated and the other PNICs in the plurality of PNICs are deactivated; a host operating system executing on the host; a virtual machine executing on the host; and a hypervisor configured to transfer packets between the host operating system and the virtual machine. The host operating system includes a link aggregator, multiple host VNICs, and a virtual switch. Of the multiple host VNICs, a first host VNIC associated with the virtual machine. The virtual switch is associated with the multiple VNICs. The first virtual machine includes a virtual network protocol stack and a guest VNIC. The link aggregator is configured to make a first determination that the first PNIC has failed. Based on the first determination, the link aggregator is further configured to: remove a virtual function mapping between the first PNIC and the virtual machine; determine the second PNIC from the plurality of PNICs; deactivate the first PNIC; and activate the second PNIC.

Other aspects of the invention will be apparent from the following description and the appended claims.

DETAILED DESCRIPTION

Figure 1:
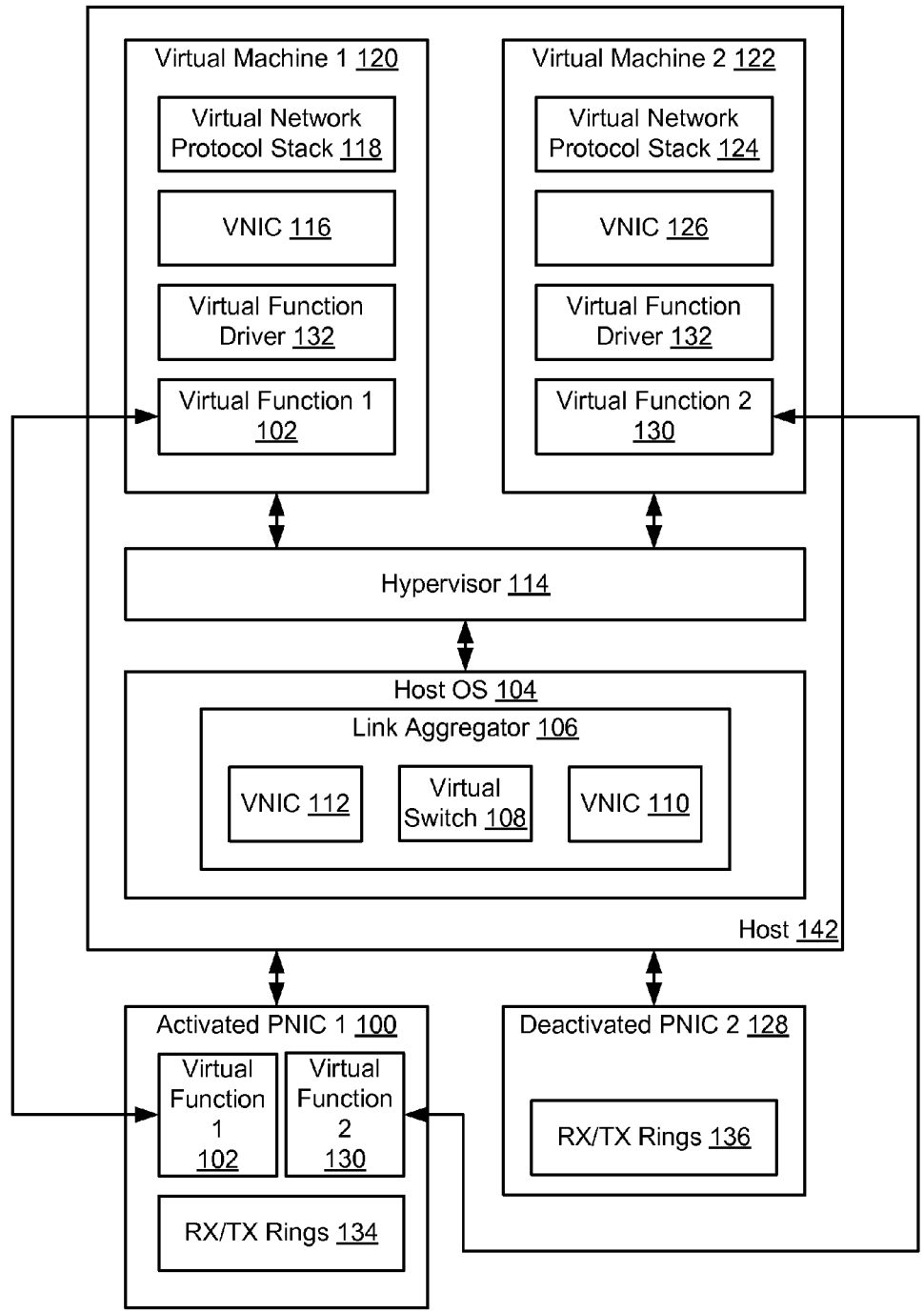
FIG. 1 shows an example of a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a system and method for maintaining direct hardware access in the event of network interface card failure. Embodiments of the invention involve the use of physical network interface cards (PNIC) in accordance with the PCI-SIG® SR-IOV specification. Under the PCI-SIG® SR-IOV specification, a PCI™-compliant physical network interface card (PNIC) is defined as having physical functions and virtual functions. A physical function is a full PCI™ function used for configuring and managing of the PNIC. A virtual function is a lightweight PCI™ function used for data movement with respect to network traffic sent and received by the PNIC. PCI-SIG® and PCI™ are trademarks of the Peripheral Component Interconnect-Special Interest Group (PCI-SIG) of Beaverton, Oreg.

In accordance with the PCI-SIG® SR-IOV specification, embodiments of the invention use a virtual function to implement a mapping between a virtual machine executing on a host computer system and a PNIC operatively connected to the host computer system. By way of the virtual function mapping, the virtual machine is provided with direct hardware access to the PNIC such that the virtual machine may directly transfer network traffic (i.e., data packets) between the virtual machine and the PNIC. Moreover, embodiments of the invention may be used to maintain direct hardware access between the virtual machine and the physical network device layer (e.g., to which the PNIC belongs) in the event that the PNIC fails. Specifically, embodiments of the invention provide for the selection and activation of a new PNIC from the physical network device layer to replace the failed PNIC. Further, direct hardware access between the virtual machine is maintained by creating a new virtual function mapping between the virtual machine and the new PNIC.

FIG. 1 shows an example of a system in accordance with one or more embodiments of the invention. Specifically, FIG. 1 shows components of a host computer system (142), including a host operating system (104), a hypervisor (114), and virtual machines (120, 122). Further, the host computer system (142) is operatively connected to physical network interface cards (PNICs)(100, 128).

In one or more embodiments of the invention, a PNIC (100, 128) is a physical hardware device operatively connected to a host computer system (142). Specifically, a PNIC (100, 128) is configured to send and receive network traffic transmitted to and from the host computer system (142) in the form of data packets. Accordingly, in one or more embodiments of the invention, a PNIC (100, 128) may include a receive and transfer rings (RX/TX ring)(134, 136) for temporarily storing incoming and outgoing network traffic respectively.

In one or more embodiments of the invention, a PNIC (100) may include one or more virtual functions (102, 130). In one or more embodiments of the invention, a virtual function (102, 130) may be used to create a mapping between a PNIC (100) and a virtual machine (120, 122) executing on the host computer system (142) such that the mapped-to virtual machine (120, 122) is provided with direct hardware access to the mapped-to PNIC (100). In one or more embodiments of the invention, a virtual function (102, 130) is mapped 1-to-1 with a virtual machine (120, 122) executing on the host computer system (142). Said another way, a first virtual function (102) for a PNIC (100) may be exclusively mapped to a first virtual machine (120), a second virtual function (130) for the PNIC (100) may be exclusively mapped to a second virtual machine (122), and so forth. In one or more embodiments of the invention, the state of a virtual function mapping between a PNIC (100) and a virtual machine (120, 122) executing on the host computer system (142) may be obtained. For example, the virtual function link between a PNIC (100) and a virtual machine (120, 122) may be operative (i.e., capable of transmitting data) or inoperative (i.e., incapable of transmitting data).

In one or more embodiments of the invention, a PNIC (100, 128) may either be an activated PNIC (100) or a deactivated PNIC (128). In one or more embodiments of the invention, an activated PNIC (100) is a PNIC that is powered on and configured to send and receive network traffic. In one or more embodiments of the invention, a deactivated PNIC (128) may be powered off or powered-down to a standby mode. In such embodiments of the invention, the deactivated PNIC (128) is not configured to send and receive network traffic.

In one or more embodiments of the invention, the state of a virtual function mapping between a PNIC (100) and a virtual machine (120, 122) may be obtained. In one or more embodiments of the invention, the aforementioned state information is obtainable so long as the PNIC (100) is either powered-on (i.e., activated) or powered-down (i.e., standby mode). Said another way, the aforementioned state information may not be obtainable when the PNIC (100) is powered-off (i.e., deactivated).

In one or more embodiments of the invention, a PNIC (100, 128) may be associated with one or more sensors (not shown) implemented in hardware or software. In one or more embodiments of the invention, a sensor may be configured to obtain a state (i.e., activated, deactivated/standby, failed) for a PNIC (100, 128). Alternatively, in one or more other embodiments of the invention, a sensor may be configured to obtain a performance metric value (e.g., temperature) associated with a state determination for a PNIC (100, 128).

In one or more embodiments of the invention, a host operating system (104) executing on the host computer system (142) is configured to process and subsequently forward a data packet initially received by a physical NIC (100, 128) to a virtual machine (120, 122) executing on the host computer system (142). Further, in one or more embodiments of the invention, the host operating system (104) is configured to send a data packet across a network to other host computer systems (not shown) using a physical NIC (100, 128).

In one or more embodiments of the invention, a host computer system (142) may be operatively connected to multiple PNICs. In one or more embodiments of the invention, a host computer system (142) may include a link aggregator (106) configured to manage a set of PNICs. A link aggregator (106) includes at least one virtual NIC (VNIC)(110, 112) and a virtual switch (108). In one or more embodiments of the invention, a link aggregator (106) is configured to use a virtual NIC (110, 112) and a virtual switch (108) to send outbound network traffic across a network to other host computer systems (not shown) using an exclusive activated physical NIC (100, 128) determined for a host computer system (142).

In one or more embodiments of the invention, the link aggregator (106) is configured to maintain a list of all PNICs (100, 128) operatively connected to the host computer system (142). In one or more embodiments of the invention, the list maintains an entry for each PNIC (100, 128) including a state for the PNIC (100, 128). Accordingly, in such embodiments, the link aggregator (106) is configured to obtain a state for a PNIC (100, 128) indicating whether the PNIC is activated, deactivated, or in standby mode. In one or more embodiments of the invention, a list entry for each PNIC (100, 128) may include a state for a virtual function mapping between the PNIC (100, 128) and a virtual machine (120, 128) executing on the host computer system (142). Accordingly, in such embodiments, the link aggregator (106) is configured to obtain a virtual function mapping state for a PNIC-virtual machine combination indicating whether there is an operative or inoperative virtual function mapping between the PNIC and the virtual machine.

In one or more embodiments of the invention, the link aggregator (106) may be configured to obtain the state information (e.g., state for a PNIC, state for virtual function mapping associated with a PNIC) for a PNIC (100, 128) using a sensor (not shown) associated with the PNIC (100, 128). For example, in one or more embodiments of the invention, the link aggregator (106) may obtain the most recent state for a PNIC (100, 128) by periodically polling a sensor associated with the PNIC (100, 128) based on a defined time interval. Alternatively, in one or more other embodiments of the invention, the link aggregator (106) may receive a notification from the sensor that a state for the PNIC (100, 128) has changed. Accordingly, in response to the notification, the link aggregator (106) may obtain the state for the PNIC (100, 128) based on receiving a notification from a sensor (not shown) associated with the PNIC (100, 128). Accordingly, based on an obtained state for a PNIC (100, 128), the link aggregator is further configured to determine that the PNIC (100, 128) has failed. Those skilled in the art will appreciate that similar polling and notification mechanisms, as described here, may be implemented to obtain any type of state information (e.g., state for a PNIC, state for virtual function mapping associated with a PNIC, etc.) associated with a PNIC.

In one or more embodiments of the invention, a host VNIC (110, 112) performs MAC layer functionality. In such embodiments of the invention, the host VNIC (110, 112) provides an abstraction layer between the PNIC (100, 128) and the various packet destinations (not shown) executing on the virtual machines (120, 128) of the host computer system (142). Each host VNIC (110, 112) operates like a PNIC (100, 128). To components above the host VNICs (110, 112) (e.g., virtual machines (120, 128)), the host VNICs (110, 112) appear as physical NICs. In one or more embodiments of the invention, each host VNIC (110, 112) is assigned a unique hardware address. In one or more embodiments of the invention, a hardware address includes at least a MAC address. In one or more further embodiments of the invention, the hardware address also includes a virtual LAN (VLAN) ID.

In one or more embodiments, each host VNIC (110, 112) may be associated with a virtual machine (120, 128). Accordingly, each host VNIC (110, 112) may be configured to send network traffic (i.e., data packets) from the associated virtual machine (120, 128) to the virtual switch (108), and to send network traffic (i.e., data packets) from the virtual switch (108) to the associated VM (120, 128).

In one or more embodiments of the invention, a virtual switch (108) performs MAC layer functionality. In such embodiments of the invention, the virtual switch (108) is configured to determine a packet destination based on a hardware address for the data packet. As such, in accordance with one or more embodiments of the invention, a virtual switch (108) is a mechanism for creating a virtual network within a host computer system (142), where the virtual network includes two or more virtual machines (120, 122) that serve as packet destinations operatively connected to the virtual switch. In one or more embodiments of the invention, the virtualized routing function of a virtual switch (108) is provided, in part, by maintaining a virtual switch table (i.e., Vswitch table, not shown). Accordingly, a Vswitch table associates each virtual machine (120, 122) executing in computer host system (142) with a respective hardware address. Virtual switches in accordance with one or more embodiments of the invention are discussed in detail in commonly owned U.S. Pat. No. 7,643,842, entitled "System and Method for Virtual Switching in a Host," in the names of Nicolas G. Droux, Sunay Tripathi, and Erik Nordmark, the contents of which are hereby incorporated by reference in their entirety.

In one or more embodiments of the invention, a hypervisor (114) executing on the host is configured to send network traffic between a host operating system (104) and a virtual machine (120, 122). A hypervisor (114) may be any communication mechanism implemented on a host computer system (142) to facilitate communication between a host operating system (104) and a virtual machine (120, 122).

In one or more embodiments of the invention, a virtual machine (120, 122) is an isolated software execution environment hosted on a host computer system (142). In accordance with embodiments of the invention, a virtual machine (120, 122) is configured to simulate the execution of a process as if the process was executing on a physical computing device. A virtual machine (120, 122) may include an instance of an operating system. The operating system executing on a virtual machine (102, 122) may or may not be the same as a host operating system (104) for the host computer system (142). Accordingly, a host computer system (142) may serve as host to multiple virtual machines (120, 122) where each virtual machine (120, 122) is associated with a distinct operating system instance and therefore a distinct kernel. In one or more embodiments of the invention, a virtual machine (120, 122) may include: (i) mapping to a virtual function (102, 130); (ii) a virtual function driver (132); (iii) a guest VNIC (116, 126); and (iv) a guest virtual network protocol stack (118, 124).

In one or more embodiments of the invention, a guest VNIC (116, 126) performs MAC layer functionality. In such embodiments of the invention, the guest VNIC (116, 126) includes the functionality of a physical NIC. Specifically, in one or more embodiments of the invention, a guest VNIC (116, 126) may be configured to send and receive network traffic (i.e., data packets) between a virtual machine (120, 122) and a host operating system (104). Further, in one or more embodiments of the invention, a guest VNIC (116, 126) may be configured to use a virtual function driver (132) and a virtual function mapping to send and receive network traffic (i.e., data packets) directly between a virtual machine (120, 122) and a PNIC (100, 128) associated by the virtual function mapping. In one or more embodiments of the invention, a guest VNIC may be implemented as described in U.S. patent application Ser. No. 11/112,063, which is hereby incorporated by reference.

In one or more embodiments of the invention, a virtual function driver (132) is an interface configured to provide a guest VNIC (116, 126) for a virtual machine (120, 122) with direct hardware access to a PNIC (100) based on a virtual function mapping between the virtual machine (120, 122) and the PNIC (100). Accordingly, the guest VNIC (116, 126) may invoke the virtual function driver to use a virtual function to directly transfer network traffic (i.e., data packets) between the virtual machine (120, 122) and the PNIC (100) without requiring: (i) use of a hypervisor (114) executing on the host computer system (142); and (ii) processing of the transferred network traffic by the host operating system (104).

In one or more embodiments of the invention, a guest virtual network protocol stack (118, 124) includes an Internet Protocol (IP) layer, inbound and outbound virtual serialization queues, and a transport layer. The IP layer, for example, is configured to perform IP level processing for both inbound and outbound data packets. The inbound virtual serialization queue is a queue data structure configured to receive data packets from the IP layer prior to the data packets being processed by the transport layer. The transport layer is configured to process inbound and outbound data packets in accordance with Transmission Control Protocol (TCP), User Datagram Protocol (UDP), or both UDP and TCP. The outbound virtual serialization queue is a queue data structure configured to receive data packets from the guest VNIC (116, 126) with which the guest virtual network stack (118, 124) is associated.

Host and guest VNICs (110, 112, 116, 126), as discussed in relation to FIG. 1, may be implemented as the VNICs described in: (i) commonly owned U.S. patent application Ser. No. 11/489,942, entitled "Multiple Virtual Network Stack Instances using Virtual Network Interface Cards," in the names of Nicolas G. Droux, Erik Nordmark, and Sunay Tripathi; and (ii) commonly owned U.S. patent application Ser. No. 11/480,000, entitled "Method and System for Controlling Virtual Machine Bandwidth" in the names of Sunay Tripathi, Tim P. Marsland, and Nicolas G. Droux. The contents of the aforementioned descriptions are hereby incorporated by reference in their entirety.

Embodiments of the invention may be utilized in a variety of virtual machine architectures. For example, one or more embodiments of the invention may be implemented on Xen® architectures involving: (i) a control host operating system (e.g., Dom 0); and (ii) one or more virtual machines (e.g., Dom U) executing guest operating system instances. In such embodiments of the invention, the hypervisor is an intermediate communication layer that passes network traffic between hardware features (e.g., PNICs) and the host/guest operating systems. Examples of exemplary architectures include, but are not limited to, Xen®. Xen® is a registered trademark overseen by the Xen Project Advisory Board.

One or more embodiments of the invention allow for the sending of a data packet received by a PNIC (100, 128) to a packet destination associated with a virtual machine (120, 122). Likewise, embodiments of the invention allow for the sending of a data packet generated by an application (not shown) executing on a virtual machine (120, 122) to a PNIC (100, 128) such that the PNIC (100, 128) may send the data packet across a network to another host computer system (not shown). To allow for the transmission of a data packet among the depicted components of FIG. 1, embodiments of the invention require the assignment of hardware addresses to each component. For example, assume that the first virtual machine (120) has a hardware address of HA1 and that the second virtual machine has a hardware address of HA2. As such, a data packet sent to the first virtual machine (120) will be addressed to the HA1 hardware address whereas a data packet sent to the second virtual machine (122) will be addressed to the HA2 hardware address.

Moreover, each virtual machine (120, 122) includes a guest VNIC (116, 126) for sending and receiving data packets. Accordingly, the guest VNIC (116, 126) for each virtual machine (120, 122) has a hardware address corresponding with the virtual machine (120, 122) with which it is associated. For example, the first guest VNIC (116) has the same hardware address (i.e., HA1) as the first virtual machine (120). Similarly, the second guest VNIC (126) has the same hardware address (i.e., HA2) as the second virtual machine (122).

The host operating system (104) includes a host VNIC (112, 110) for sending and receiving data packets to and from each virtual machine (120, 122). For example, the first host VNIC (112) is configured to send and receive data packets from the first virtual machine (120). As such, the first host VNIC is associated with the same hardware address as the first virtual machine (120): HA1. Similarly, the second host VNIC (110) is configured to send and receive data packets from the second virtual machine (122). As such, the second host VNIC (110) is associated with the same hardware address as the second virtual machine (122): HA1.

The host operating system (104) also includes a virtual switch (108) associated with each of the host VNICs (112, 110). As such, the virtual switch (108) maintains a Vswitch table (not shown) that associates the first virtual machine (120) with a corresponding hardware address (e.g., HA1) and the second virtual machine (122) with a corresponding hardware address (e.g., HA2). Accordingly, when the host operating system receives an inbound data packet, the virtual switch may use a hardware address for the inbound data packet to determine a corresponding host VNIC (112, 110)/virtual machine (120, 122).

Figure 2A:
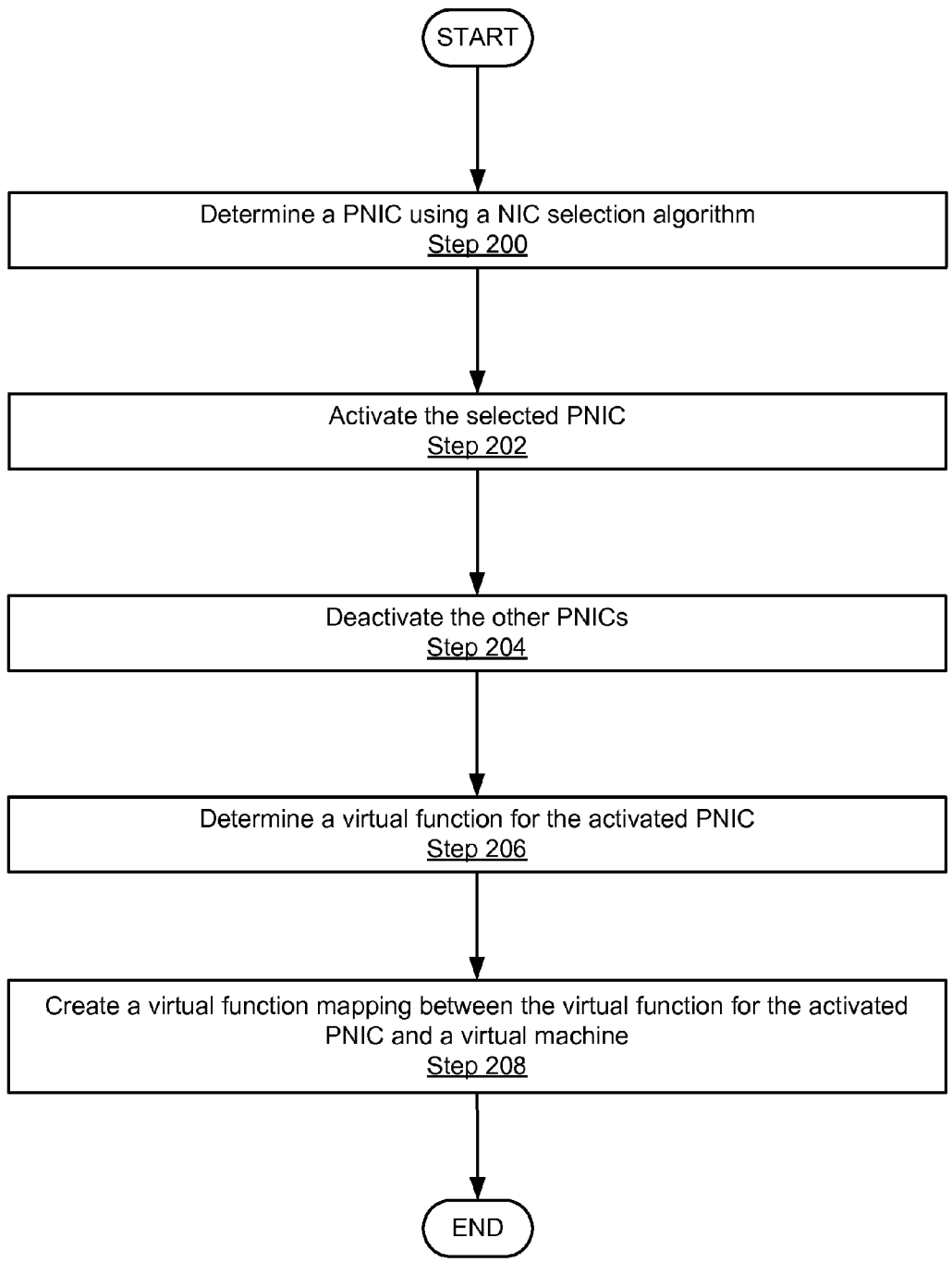
FIGS. 2a and 2b show a flowchart in accordance with one or more embodiments of the invention.
Figure 2B:
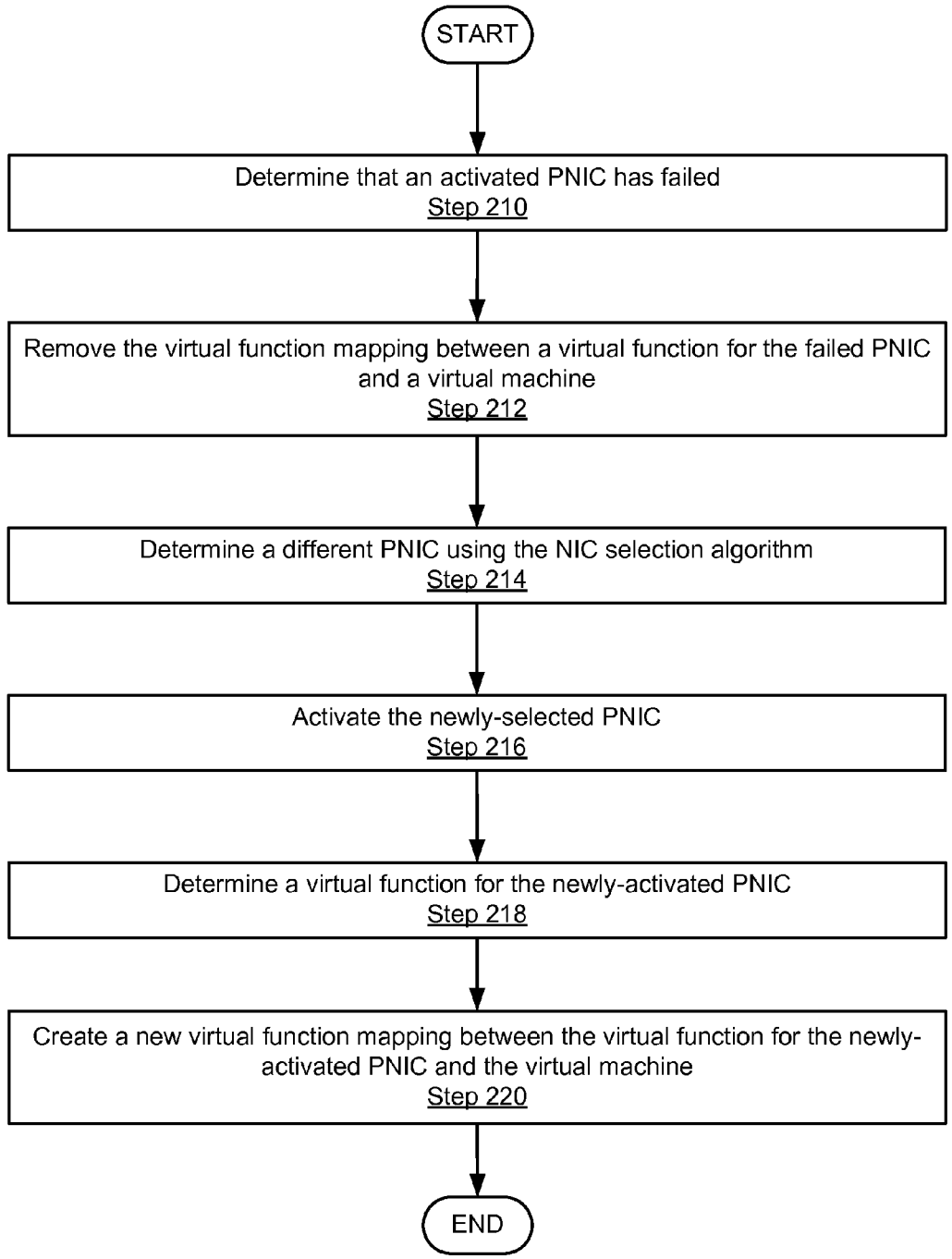

FIGS. 2a and 2b show a flowchart in accordance with one or more embodiments of the invention. While the various steps in the flowchart are presented and described sequentially, one of ordinary skill will appreciate that some or all of the steps may be executed in different orders, may be combined, or omitted, and some or all of the steps may be executed in parallel. In one or more embodiments of the invention, the processes described in relation to FIGS. 2a and 2b are implemented in the link aggregator (e.g., element 106 as shown in FIG. 1).

The process shown in FIG. 2a may be used, for example when a host computer system is booting, to activate a PNIC and subsequently create a virtual function mapping between the activated PNIC and a virtual machine.

In Step 200, a PNIC is determined using a NIC selection algorithm. In one or more embodiments of the invention, the link aggregator includes functionality to execute one or more NIC selection algorithms for purposes of determining one of a plurality of PNICs operatively connected to a host computer system. In one or more embodiments of the invention, a NIC selection algorithm uses a list of PNICs and corresponding PNIC states as maintained by the link aggregator. In one or more embodiments of the invention, a system administrator may define a NIC selection algorithm based on knowledge of the network topology and applications executing on the host computer system. In one or more embodiments of the invention, the PNIC determined by the NIC selection algorithm is the PNIC designated for sending and receiving network traffic for the host computer system.

In Step 202, the selected PNIC is activated. In Step 204, all other PNICs (i.e., PNICs other than the selected PNIC) are deactivated (i.e., powered off). In accordance with embodiments of the invention, only the selected PNIC is capable of sending and receiving network traffic for the host computer system after the completion of Step 204.

In Step 206, a virtual function is determined for the activated PNIC. In Step 208, a virtual function mapping is created associating the activated PNIC with a virtual machine executing on the host computer system. In one or more embodiments of the invention, the virtual function mapping is a 1-to-1 mapping that has the effect of exclusively associating the particular virtual function for the PNIC with the particular virtual machine.

In accordance with embodiments of the invention, and based on the created virtual function mapping, the mapped-to virtual machine now has direct hardware access to the mapped-to PNIC at the completion of Step 208. Accordingly, the virtual machine may directly transfer network traffic (i.e., data packets) between the virtual machine and the PNIC without requiring: (i) use of a hypervisor executing on a host computer system; and (ii) processing of the transferred network traffic by a host operating system executing on the host computer system.

The process shown in FIG. 2b may be used, for example, to maintain direct hardware access for a virtual machine executing on a host computer system when a previously activated PNIC for the host computer system fails.

In Step 210, a determination is made that a previously activated PNIC operatively connected to a host computer system has failed. For example, the activated PNIC may experience a malfunction such that the PNIC is no longer capable of sending and receiving network traffic for the host computer system to which the PNIC is operatively connected. In one or more embodiments of the invention, the link aggregator is configured to obtain a state for the previously activated PNIC and, based on the obtained state, make a determination that the previously activated PNIC has failed.

In Step 212, a virtual function mapping between the failed PNIC and a virtual machine is removed.

In Step 214, a different PNIC operatively connected to the host computer system is determined using a NIC selection algorithm. NIC selection algorithms are discussed in relation to Step 200 of FIG. 2a. In Step 216, the newly-selected PNIC is activated. Further, the failed PNIC is deactivated (not shown). In accordance with embodiments of the invention, the newly-selected PNIC is used to send and receive network traffic for the host computer system.

In Step 218, a virtual function is determined for the newly-activated PNIC. In Step 220, a virtual function mapping is created associating the newly-activated PNIC with the virtual machine (i.e., the virtual machine for which the virtual function mapping was removed in Step 212) executing on the host computer system. In one or more embodiments of the invention, the virtual function mapping is a 1-to-1 mapping that has the effect of exclusively associating the virtual function for the newly-selected PNIC with the virtual machine.

In accordance with embodiments of the invention, the process described in FIG. 2b allow the mapped-to virtual machine to maintain direct hardware access to an activated PNIC operatively connected to the host computer system even in the event of a PNIC failure.

The following example describes various embodiments of the invention and is not intended to limit the scope of the invention.

Figure 3A:
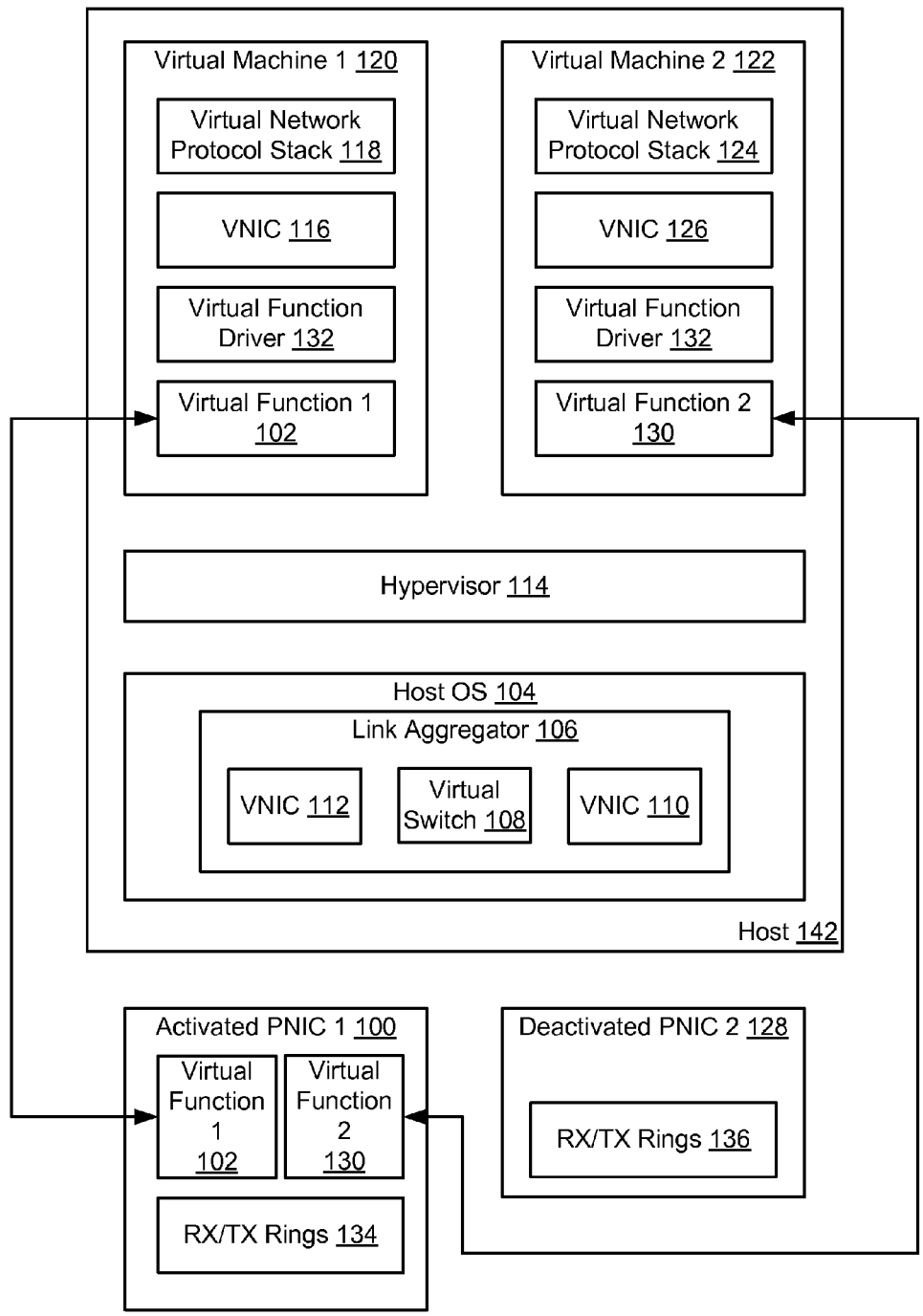
FIGS. 3a-3c shows an example of a system in accordance with one or more embodiments of the invention.
Figure 3B:
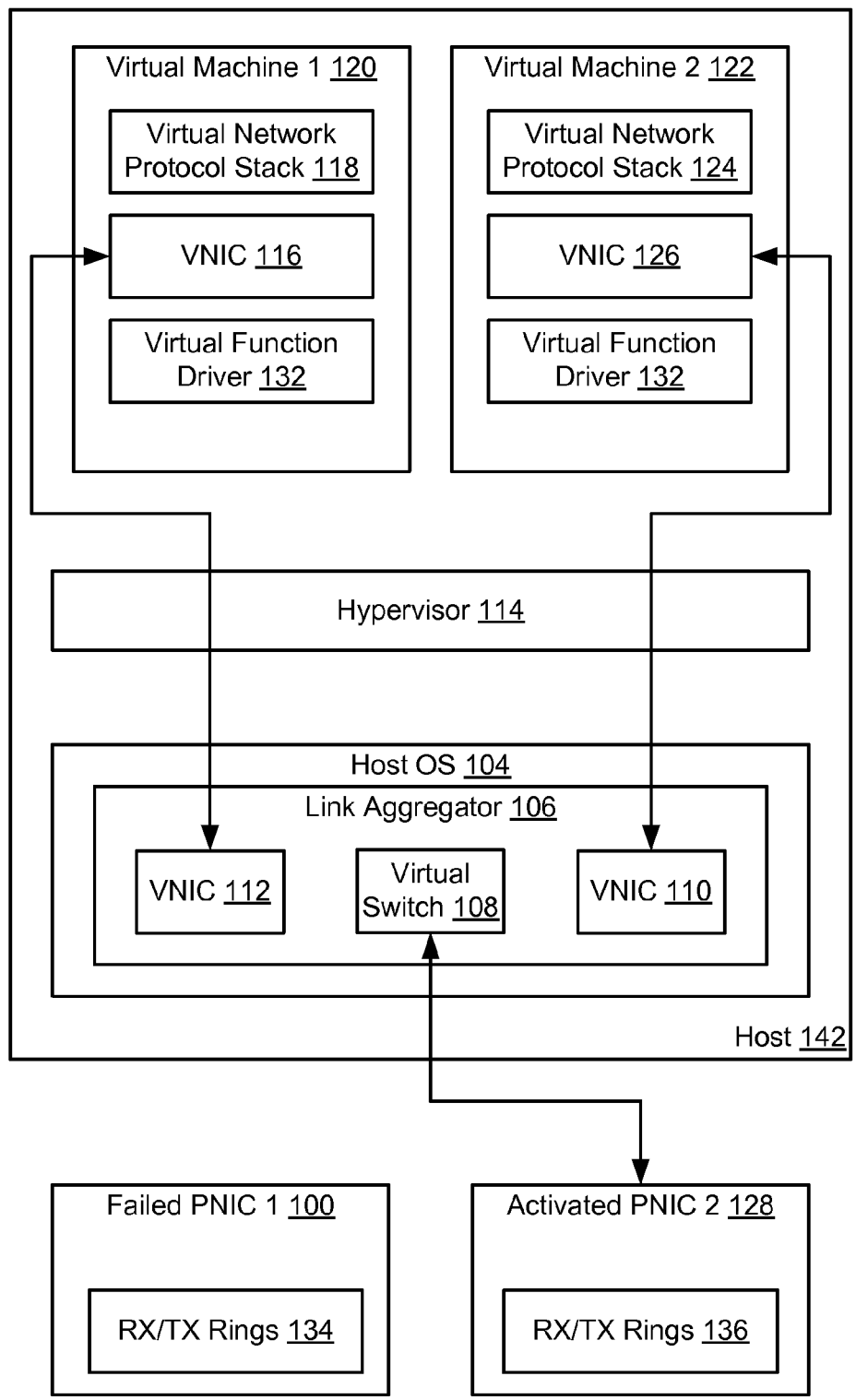
Figure 3C:
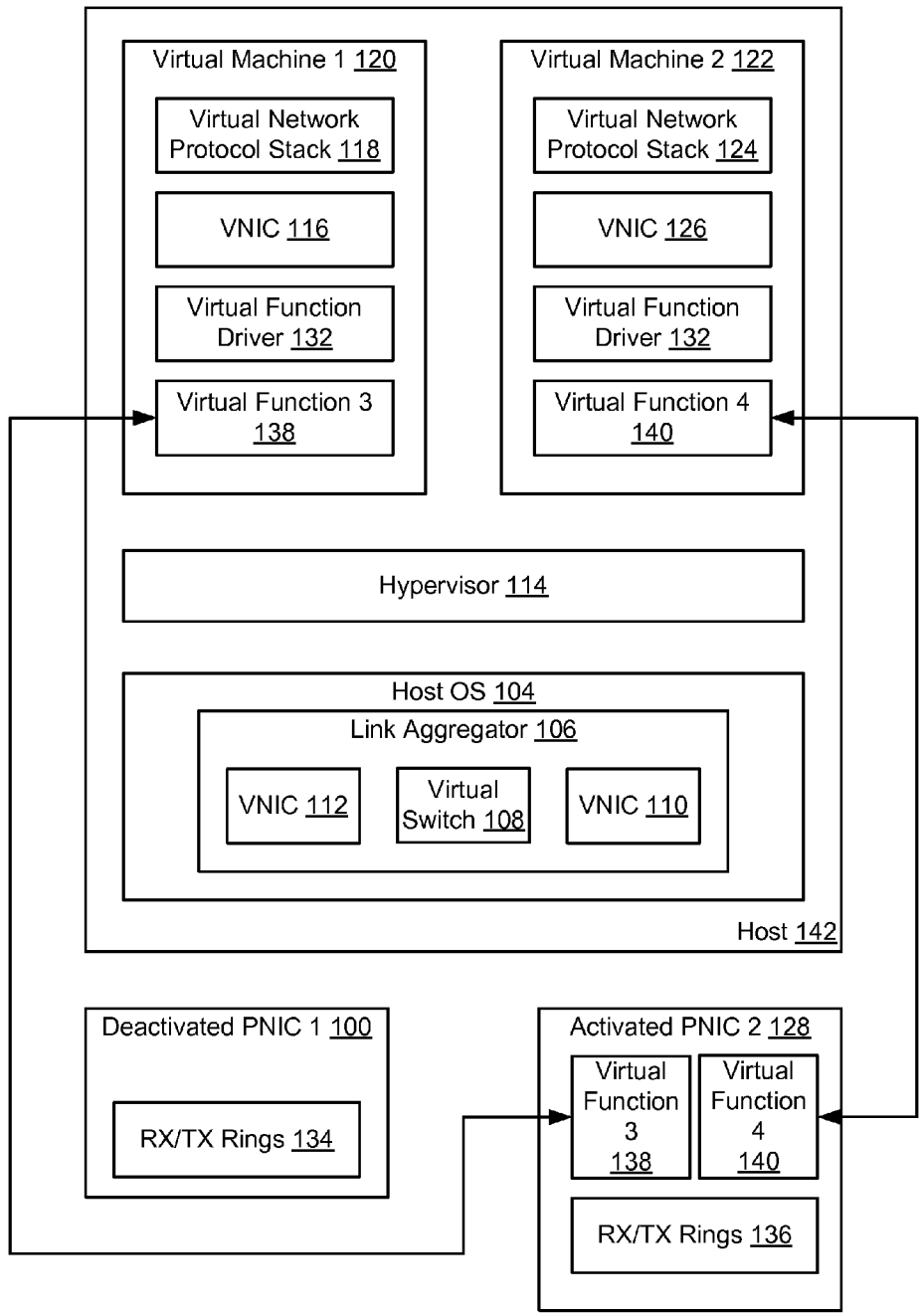

FIGS. 3a-3c is an example of a system in accordance with one or more embodiments of the invention. The system depicted in FIGS. 3a-3c features many of the same components shown in and described in relation to FIG. 1. As such, FIGS. 3a-3c show components of a host computer system (142), including a host operating system (104), a hypervisor (114), and two virtual machines (120, 122). Further, the host computer system (142) is operatively connected to two PNICs (100, 128).

With respect to FIG. 3a, assume the host computer system (142) has just finished booting. Accordingly, a link aggregator (106) determines a PNIC (100) using a NIC selection algorithm chosen by an administrative user for the host computer system (142). Based on the determination, the link aggregator (106) activates the selected PNIC (100) and deactivates the other PNIC (128) operatively connected to the host computer system (142). As such, only the activated PNIC (100) is used to send and receive network traffic (i.e., data packets) for the host computer system (142).

Further, the link aggregator (106) determines a first virtual function (102) for the activated PNIC (100). Based on the determination of the first virtual function (102), the link aggregator (106) creates a first virtual function mapping between the first virtual function (102) and a first virtual machine (120). As such, FIG. 3a indicates, with the left-most bi-directional line, that the first virtual function (102) in the activated PNIC (100) corresponds with a first virtual function (102) in the first virtual machine (120). Accordingly, the first virtual machine (120) may directly transfer network traffic (i.e., data packets) between the first virtual machine (120) and the activated PNIC (100) without requiring: (i) use of the hypervisor (114); and (ii) processing of the transferred network traffic by the host operating system (104).

Additionally, the link aggregator (106) determines a second virtual function (130) for the activated PNIC (100). Based on the determination of the second virtual function (130), the link aggregator (106) creates a second virtual function mapping between the second virtual function (130) and a second virtual machine (122). As such, FIG. 3a indicates, with the right-most bi-directional line, the second virtual function (130) in the activated PNIC (100) corresponds with a second virtual function (130) in the second virtual machine (122). Accordingly, the second virtual machine (122) may directly transfer network traffic (i.e., data packets) between the second virtual machine (122) and the activated PNIC (100) without requiring: (i) use of the hypervisor (114); and (ii) processing of the transferred network traffic by the host operating system (104).

With respect to FIG. 3b, assume that the first PNIC (100) has failed. Because the link aggregator (106) is configured to obtain a state for the first PNIC (100), the link aggregator (106) makes a determination that the first PNIC (100) has failed based on an obtained state for the PNIC (100). Accordingly, based on the determination that the first PNIC (100) has failed, the link aggregator (106) removes the first and second virtual function mappings (i.e., the virtual functions used to provide the depicted virtual machines (120, 122).

Because the system shown in FIG. 3b no longer includes any virtual function mappings, the virtual machines (120, 122) are no longer equipped with direct hardware access capability with respect to an activated PNIC. Said another way, the system of FIG. 3b does not facilitate the direct transfer of network traffic (i.e., data packets) between the depicted virtual machines (120, 122) and the physical network hardware layer (100, 128) of the host computer system. Because the first PNIC (100) has failed, the link aggregator (106) determines a different PNIC (128) using the defined NIC selection algorithm. Based on the determination of the link aggregator (106), the link aggregator (106) activates the newly-selected PNIC (128). Further, the link aggregator (106) deactivates the failed PNIC (100). As such, only the newly-activated PNIC (128) is used to send and receive network traffic (i.e., data packets) for the host computer system (142).

The newly-activated PNIC (128) does not include any virtual function mapping with any virtual machine (120, 122). Said another way, the newly-activated PNIC (128) does not currently support PCI-SIG® SR-IOV. As such, because of the absence of any virtual function mapping, there is no direct hardware access benefit for the virtual machines (120, 122) depicted in FIG. 3b. As such, all network traffic requires processing by the host operating system (104) and the hypervisor (114). For example, assume that an outbound data packet is generated by a virtual machine (120, 122). A virtual network protocol stack (118, 124) for the virtual machine (120, 122) performs IP and transport layer processing for the outbound data packet. A guest VNIC (116, 126) for the virtual machine (120, 122) sends the outbound data packet to a host VNIC (112, 110) associated with the virtual machine (120, 122) in the host operating system (104). Specifically, the guest VNIC (116, 126) must use the hypervisor (114) to send the outbound data packet from the virtual machine (120, 122) to the host operating system (104) (e.g., as indicated in FIG. 3b by a bi-directional arrow between a VNIC (116, 126) in the virtual machine (120, 122) and a VNIC in the link aggregator (106)/host operating system (104)). The host operating system (104) uses a back-end driver (not shown) configured to interface with the hypervisor (114) to receive the outbound data packet. Once the host operating system (104) has received the outbound data packet, a host VNIC (112, 110) determines, using a virtual switch (108), whether a hardware address for the outbound data packet corresponds with a hardware address for any of the other host VNICs with which the virtual switch (108) is associated. If the hardware address for the outbound data packet does not correspond with a hardware address for another host VNIC, the host VNIC (112, 110) sends the outbound data packet to the link aggregator (106). The link aggregator (106) sends the outbound data packet to the activated PNIC (100) (e.g., as indicated in FIG. 3b by a bi-direction arrow between the host operating system (104) and the newly-activated second PNIC (128)). Upon receiving the outbound data packet, the activated PNIC (128) sends the outbound data packet across a network to another host computer system (not shown).

Moreover, inbound network traffic (i.e., originating from a remote host computer system (not shown) and received over the network by a PNIC (128) operatively connected to the depicted host computer system (142)) must be processed by the host operating system (104). Specifically, a virtual switch (108) associated with the host operating system (104) determines a VNIC (110, 112) for processing a received data packet based on a destination hardware address specified for the data packet. Once a VNIC (110, 112) is selected for processing the data packet, the selected VNIC (110, 112) is used to send the received data packet through the hypervisor (114) to a virtual machine (120, 122) associated with the selected VNIC (110, 112).

With respect to the aforementioned scenarios when no virtual function mapping is available to provide direct hardware access between virtual machines (120, 122) and a PNIC (128), a pseudo-driver (not shown) may be used to send a data packet through the hypervisor (114). For example, with respect to outbound network traffic, a VNIC (116, 126) associated with a virtual machine (120, 122) may necessarily use the pseudo-driver for the hypervisor (114) instead of the virtual function driver to send the outbound data packet from the virtual machine (120, 122). Accordingly, with respect to inbound network traffic, a VNIC (110, 112) associated with the host operating system (104) may use a back-end driver (not shown) for interfacing with the hypervisor (114) to send the inbound data packet from the host operating system (104) to a virtual machine (120, 122).

With respect to FIG. 3c, the link aggregator (106) determines a third virtual function (138) for the newly-activated second PNIC (128). Based on the determination of the third virtual function (138), the link aggregator (106) creates a third virtual function mapping between the third virtual function (138) and the first virtual machine (120). As such, FIG. 3c indicates, with the left-most bi-directional line, that the third virtual function (138) in the newly-activated second PNIC (128) corresponds with a third virtual function (138) in the first virtual machine (120). Accordingly, the first virtual machine (120) may directly transfer network traffic (i.e., data packets) between the first virtual machine (122) and the newly-activated second PNIC (128) without requiring: (i) use of the hypervisor (114); and (ii) processing of the transferred network traffic by the host operating system (104).

Further, the link aggregator (106) determines a fourth virtual function (140) for the newly-activated second PNIC (128). Based on the determination of the fourth virtual function (140), the link aggregator (106) creates a fourth virtual function mapping between the fourth virtual function (140) and the second virtual machine (122). As such, FIG. 3c indicates, with the right-most bi-directional line, the fourth virtual function (140) in the newly-activated second PNIC (128) corresponds with a fourth virtual function (140) in the second virtual machine (122). Accordingly, the second virtual machine (122) may directly transfer network traffic (i.e., data packets) between the second virtual machine (122) and the newly-activated second PNIC (128) without requiring: (i) use of the hypervisor (114); and (ii) processing of the transferred network traffic by the host operating system (104).

The creation of the third and fourth virtual function mappings between the depicted virtual machines (120, 122) and the newly-activated second PNIC (128) enable the depicted virtual machines to continue to directly access network traffic received by and at the activated PNIC (128) operatively connected to the host computer system (142) even in the event that the previously activated PNIC (100) failed. As such, both inbound and outbound network traffic may be transferred directly between the virtual machines (120) and the activated PNIC (128) without incurring additional processing costs associated with the host operating system (104) and hypervisor (114).

In accordance with embodiments of the invention, the perspective of the virtual network protocol stack (118, 124) and any other application (not shown) hosted on a virtual machine (120, 122) above the VNIC (116, 126) is unchanged with respect any newly-introduced virtual function mapping. For example, the virtual network protocol stack (118) of the first virtual machine (120) is not aware that the first virtual function (102) used in FIG. 3a is different from the third virtual function (138) used in FIG. 3c. Rather, throughout the example (i.e., FIGS. 3a-3c), the virtual network protocol stack (118) merely retains the perspective that the hosting virtual machine (120) is interacting with the physical network hardware layer (i.e., PNICs)(100, 128) for the host computer system 142).

As described above, one or more embodiments of the invention make use of virtual function mappings between a virtual machine (120, 122) and a PNIC (100, 128) to directly transfer network traffic between a PNIC and a virtual machine and therefore bypassing the routing (and associated processing) of network traffic through the hypervisor (114) and host operating system (104). In enabling direct transfer, a guest VNIC (116, 126) uses a virtual function driver (132) to send and receive network traffic. However, when a virtual function mapping is not in place, the guest VNIC (116, 126) uses a pseudo-driver (not shown) to send an receive network traffic. Accordingly, embodiments of the invention may require the guest VNIC (116, 126) to determine whether the virtual function driver (132) or pseudo-driver (not shown) is to be used for purposes of sending and receiving network traffic. In one or more embodiments of the invention, the link aggregator (106) is configured to send a notification to a guest VNIC (116, 126) executing in a virtual machine (120, 122) for purposes of notifying when a virtual function mapping is created or removed (e.g., as described in relation to Steps 208, 212, and 220). Accordingly, based on the last notification received, a guest VNIC (116, 126) may be configured to determine whether direct transfer of network traffic is viable (i.e., by way of using the virtual function driver) or not.

Figure 4:
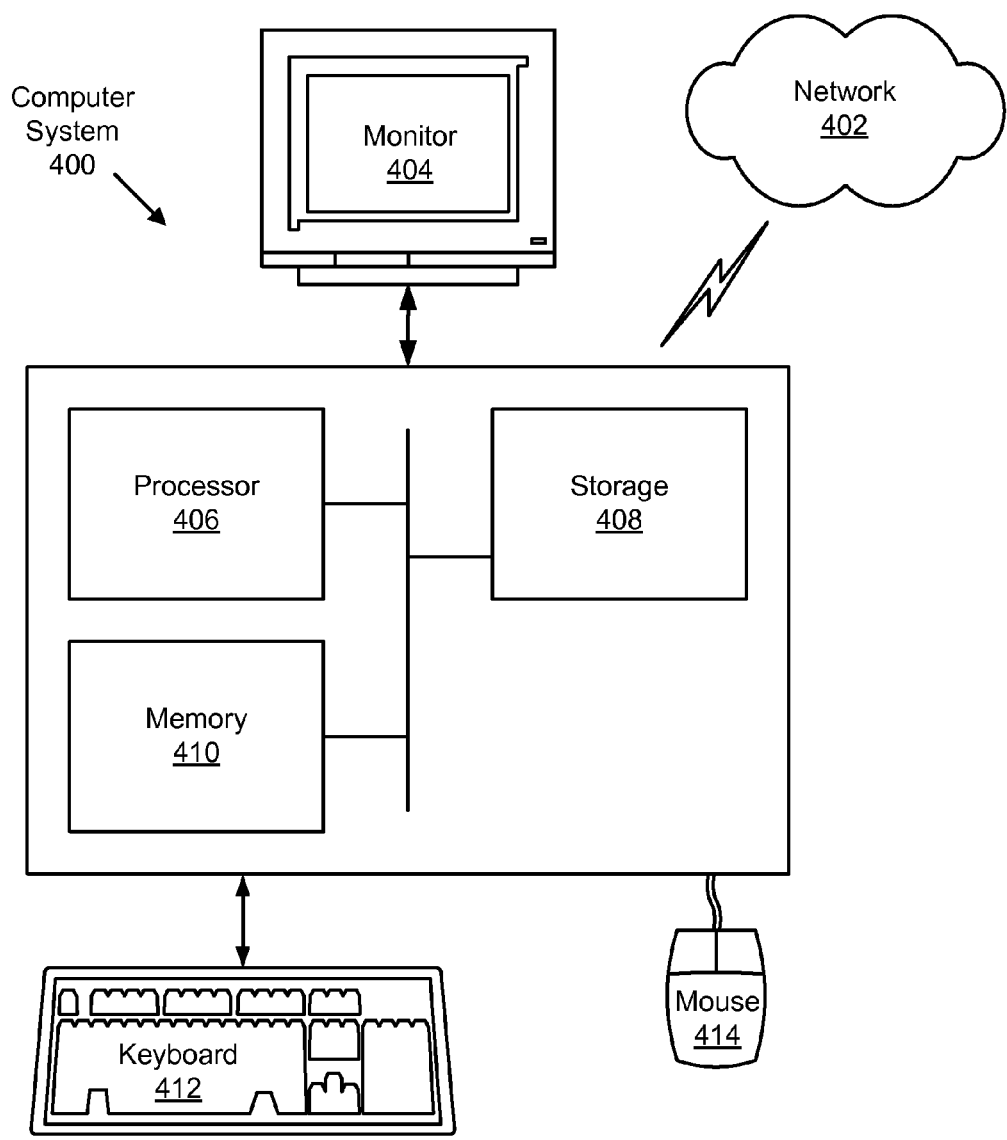
FIG. 4 shows a computer system in accordance with one or more embodiments of the invention.

Embodiments of the invention may be implemented on virtually any type of computer regardless of the platform being used. For example, as shown in FIG. 4, a computer system (400) includes one or more processors (406), associated memory (410) (e.g., random access memory (RAM), cache memory, flash memory, etc.), a storage device (408) (e.g., a hard disk, an optical drive such as a compact disk drive or digital video disk (DVD) drive, a flash memory stick, etc.), and numerous other elements and functionalities typical of today's computers (not shown). The computer (400) may also include input means, such as a keyboard (412), a mouse (414), or a microphone (not shown). Further, the computer (400) may include output means, such as a monitor (404) (e.g., a liquid crystal display (LCD), a plasma display, or cathode ray tube (CRT) monitor). The computer system (400) may be connected to a network (402) (e.g., a local area network (LAN), a wide area network (WAN) such as the Internet, or any other similar type of network) via a network interface connection (not shown). Those skilled in the art will appreciate that many different types of computer systems exist, and the aforementioned input and output means may take other forms. Generally speaking, the computer system (400) includes at least the minimal processing, input, and/or output means necessary to practice embodiments of the invention.

Further, those skilled in the art will appreciate that one or more elements of the aforementioned computer system (400) may be located at a remote location and connected to the other elements over a network. Further, embodiments of the invention may be implemented on a distributed system having a plurality of nodes, where each portion of the invention may be located on a different node within the distributed system. In one embodiment of the invention, the node corresponds to a computer system. Alternatively, the node may correspond to a processor with associated physical memory. The node may alternatively correspond to a processor with shared memory and/or resources.

Further, computer readable program code to perform embodiments of the invention may be stored on a computer readable medium such as a compact disc (CD), a diskette, a tape, physical memory, or any other physical computer readable storage medium that includes functionality to store computer readable program code to perform embodiments of the invention. In one embodiment of the invention the computer readable program code, when executed by a processor(s), is configured to perform embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A non-transitory computer readable medium comprising instructions for maintaining direct hardware access in the event of network interface card failure, the instructions comprising functionality for:
    making a first determination that a first physical network interface card (PNIC) has failed,
        wherein the first PNIC is one of a plurality of PNICs operatively connected to a host computer system,
        wherein the first PNIC is activated and the other PNICs in the plurality of PNICs are deactivated, and
        wherein a deactivated PNIC does not send packets;
    based on the first determination that the first PNIC has failed:
        removing a first virtual function mapping between the first PNIC and a first virtual machine executing on the host computer system based on the first determination, wherein the first virtual function mapping associates a first virtual function for the first PNIC with the first virtual machine;
        determining a second PNIC from the plurality of PNICs;
        deactivating the first PNIC;
        activating the second PNIC;
        determining a second virtual function for the second PNIC; and
        creating a second virtual function mapping between the second PNIC and the first virtual machine, wherein the second virtual function mapping associates the second virtual function with the first virtual machine,
        wherein after activating the second PNIC but before creating the second virtual function mapping between the second PNIC and the first virtual machine, a first virtual network interface card (VNIC) for the first virtual machine is configured to send an outbound data packet to a second VNIC for a host operating system,
        wherein the second VNIC is associated with a virtual switch, and
        wherein the second VNIC uses the virtual switch to determine whether a hardware address for the outbound data packet corresponds with any other VNIC associated with the virtual switch.

2. The non-transitory computer readable medium of claim 1, wherein after creating the second virtual function mapping between the second PNIC and the first virtual machine, the first VNIC for the first virtual machine is configured to use the second virtual function to send an outbound data packet to the second PNIC.

3. The non-transitory computer readable medium of claim 2, wherein using the second virtual function comprises invoking a virtual function driver, wherein the virtual function driver is an interface configured to provide direct hardware access to a PNIC based on a virtual function mapping between a virtual machine and the PNIC.

4. The non-transitory computer readable medium of claim 2, wherein a VNIC performs MAC layer functionality to send and receive data packets.

5. The non-transitory computer readable medium of claim 2, wherein sending the outbound data packet to the second PNIC using the second virtual function comprises:
    transferring the outbound data packet directly between the second PNIC and the first virtual machine without requiring use of a hypervisor and without requiring processing of the outbound data packet by the host operating system.

6. The non-transitory computer readable medium of claim 1, wherein the first VNIC for the first virtual machine is configured to receive an inbound data packet from the second PNIC using the second virtual function.

7. The non-transitory computer readable medium of claim 6, wherein receiving the inbound data packet from the second PNIC using the second virtual function comprises:
    transferring the inbound data packet directly between the second PNIC and the first virtual machine without requiring use of a hypervisor and without requiring processing of the inbound data packet by the host operating system.

8. The non-transitory computer readable medium of claim 1, wherein the first VNIC and the second VNIC have the same corresponding hardware address.

9. A system for maintaining direct hardware access in the event of network interface card failure, comprising:
    a host comprising a processor;
    a first physical network interface card (PNIC);
    a second PNIC,
        wherein the first PNIC and the second PNIC are two of a plurality of PNICs operatively connected to the host,
        wherein the first PNIC is activated and the other PNICs in the plurality of PNICs are deactivated, and
        wherein a deactivated PNIC does not send packets;
    a host operating system executing on the host, comprising:
        a link aggregator;
        a plurality of host VNICs, wherein the plurality of host VNICs comprises a first host VNIC associated with the first virtual machine; and
        a virtual switch, wherein the virtual switch is associated with the plurality of host VNICs;
    a first virtual machine executing on the host, comprising:
        a first virtual network protocol stack; and
        a first guest VNIC;
    a hypervisor configured to transfer packets between the host operating system and the first virtual machine,
    wherein the link aggregator is configured to:
        make a first determination that the first PNIC has failed;
        based on the first determination that the first PNIC has failed:
            remove a first virtual function mapping between the first PNIC and the first virtual machine;
            determine the second PNIC from the plurality of PNICs;
            deactivate the first PNIC;
            activate the second PNIC;
            determine a second virtual function for the second PNIC; and
            create a second virtual function mapping between the second PNIC and the first virtual machine, wherein the second virtual function mapping associates the second virtual function with the first virtual machine,
                wherein after the second PNIC is activated but before the second virtual function mapping between the second PNIC and the first virtual machine is created, a first virtual network interface card (VNIC) for the first virtual machine is configured to send an outbound data packet to a second VNIC for the host operating system,
wherein the second VNIC is associated with a virtual switch, and
wherein the second VNIC uses the virtual switch to determine whether a hardware address for the outbound data packet corresponds with any other VNIC associated with the virtual switch.

10. The system of claim 9, wherein the first virtual function is used to directly transfer packets between the first PNIC and the first virtual machine without requiring use of the hypervisor and without requiring processing of the transferred packets by the host operating system.

11. The system of claim 9, wherein the second virtual function is used to directly transfer packets between the second PNIC and the first virtual machine without requiring use of the hypervisor and without requiring processing of the transferred packets by the host operating system.

12. The system of claim 9, wherein the link aggregator is further configured to:
determine the first PNIC from the plurality of PNICs;
deactivate the other PNICs in the plurality of PNICs;
activate the first PNIC;
determine the first virtual function for the first PNIC; and
create the first virtual function mapping between the first PNIC and the first virtual machine.

13. The system of claim 9, wherein a NIC selection algorithm is used by the link aggregator to determine the second PNIC from the plurality of PNICs.

14. The system of claim 9, wherein
when the link aggregator removes the first virtual function mapping and activates the second PNIC:
the first virtual network protocol stack is configured to:
process an outbound data packet according to an Internet Protocol (IP) and a transport layer protocol;
the first guest VNIC is configured to:
send the outbound data packet to the host VNIC of the host operating system, wherein the outbound data packet is sent from the first guest VNIC to the host VNIC using the hypervisor;
the first host VNIC is configured to:
receive the outbound data packet from the first guest VNIC;
make a second determination, using the virtual switch, that a first hardware address for the outbound data packet does not correspond with any of the plurality of host VNICs;
based on the second determination:
send the outbound data packet to the link aggregator;
the link aggregator is further configured to:
send the outbound data packet to the second PNIC;
the second PNIC is configured to:
receive the outbound data packet from the link aggregator; and
send the outbound data packet over a network.

15. The system of claim 9, wherein:
when the link aggregator removes the first virtual function mapping and activates the second PNIC:
the second PNIC is configured to:
receive an inbound data packet over a network;
send the inbound data packet to the link aggregator;
the link aggregator is further configured to:
send the inbound data packet to the virtual switch for the host operating system;
the virtual switch is configured to:
receive the inbound data packet from the second PNIC;
make a second determination that a second hardware address for the inbound data packet corresponds with the first host VNIC; and
based on the second determination:
send the inbound data packet to the first host VNIC;
the first host VNIC is configured to:
receive the inbound data packet from the virtual switch; and
send the inbound data packet to the first guest VNIC for the first virtual machine; and
the first guest VNIC is configured to:
receive the inbound data packet from the first host VNIC.

16. The system of claim 9, wherein:
when the link aggregator determines the second virtual function and creates the second virtual function mapping between the second PNIC and the first virtual machine:
the first virtual network protocol stack is configured to:
process an outbound data packet according to an Internet Protocol (IP) and a transport layer protocol;
the first guest VNIC is configured to:
send, using the second virtual function, the outbound data packet to the second PNIC;
the second PNIC is configured to:
receive, using the second virtual function, the outbound data packet from the first guest VNIC; and
send the outbound data packet over a network.

17. The system of claim 9, wherein
when the link aggregator determines the second virtual function and creates the second virtual function mapping between the second PNIC and the first virtual machine:
the second PNIC is configured to:
receive an inbound data packet over a network;
send, using the second virtual function, the inbound data packet to the first guest VNIC for the first virtual machine;
the first guest VNIC is configured to:
receive, using the second virtual function, the inbound data packet from the second PNIC.

18. The system of claim 9, further comprising:
a second virtual machine executing on the host, comprising:
a second virtual network protocol stack; and
a second guest VNIC;
wherein the link aggregator is further configured to:
based on the first determination that the first PNIC has failed:
remove a second virtual function mapping between the first PNIC and the second virtual machine;
determine a second virtual function for the second PNIC; and
create a third virtual function mapping between the second PNIC and the second virtual machine,
wherein the third virtual function mapping associates the second virtual function with the second virtual machine, and wherein the second virtual function is used to directly transfer packets between the second PNIC and the second virtual machine without requiring use of the hypervisor and without requiring processing of the transferred packets by the host operating system.

* * * * *